(12) United States Patent
Seabright et al.

(10) Patent No.: US 10,606,928 B2
(45) Date of Patent: Mar. 31, 2020

(54) ASSISTIVE TECHNOLOGY FOR THE IMPAIRED

(71) Applicant: Open Text Holdings, Inc., San Mateo, CA (US)

(72) Inventors: Richard James Seabright, Oshawa (CA); Zhigang Li, Calgary (CA); Cary Timar, Toronto (CA)

(73) Assignee: OPEN TEXT HOLDINGS, INC., San Mateo, CA (US)

( * ) Notice: Subject to any disclaimer, the term of this patent is extended or adjusted under 35 U.S.C. 154(b) by 0 days.

(21) Appl. No.: 15/253,396

(22) Filed: Aug. 31, 2016

(65) Prior Publication Data

US 2016/0371233 A1    Dec. 22, 2016

Related U.S. Application Data

(63) Continuation-in-part of application No. 14/939,918, filed on Nov. 12, 2015, which is a continuation of
(Continued)

(51) Int. Cl.
*G09B 21/00*    (2006.01)
*G06F 3/12*    (2006.01)
(Continued)

(52) U.S. Cl.
CPC .......... *G06F 17/218* (2013.01); *G06F 3/1206* (2013.01); *G06F 3/1208* (2013.01);
(Continued)

(58) Field of Classification Search
CPC ............................ G06F 3/1206; G06F 17/218
See application file for complete search history.

(56) References Cited

U.S. PATENT DOCUMENTS

| 6,546,133 B1 | 4/2003 | Temkin et al. |
| 6,934,909 B2 | 8/2005 | Tewari |

(Continued)

OTHER PUBLICATIONS

Ganza, Peter, "What's in a Name?", http://pganza.wordpress.com, Mar. 22, 2010, 5 pages.
(Continued)

*Primary Examiner* — Scott T Baderman
*Assistant Examiner* — Steve P Golden
(74) *Attorney, Agent, or Firm* — Sprinkle IP Law Group

(57) ABSTRACT

Disclosed are methods and apparatus for generating accessible documents. In one embodiment, an initial document in a print format is obtained. The print format of the initial document is identified as one of a plurality of print formats. A parser corresponding to the one of the plurality of print formats is applied such that the initial document is parsed according to the print format of the initial document. An intermediate document that conforms to an intermediate format is generated based upon results obtained from applying the parser. A template for converting the intermediate document into an accessible document is obtained. The template is then such that an accessible document corresponding to the initial document is generated, wherein the accessible document includes a plurality of tags that designate an order of a plurality of regions of the accessible document.

21 Claims, 6 Drawing Sheets

Related U.S. Application Data application No. 14/595,982, filed on Jan. 13, 2015, now Pat. No. 9,223,764, which is a continuation of application No. 14/136,939, filed on Dec. 20, 2013, now Pat. No. 8,964,201, which is a continuation of application No. 13/045,347, filed on Mar. 10, 2011, now Pat. No. 8,619,272.

(60) Provisional application No. 61/322,774, filed on Apr. 9, 2010.

(51) Int. Cl.
    *G06F 17/27*     (2006.01)
    *G06F 17/21*     (2006.01)
    *G06F 17/24*     (2006.01)
    *G06F 17/22*     (2006.01)

(52) U.S. Cl.
CPC .......... *G06F 3/1244* (2013.01); *G06F 3/1245* (2013.01); *G06F 3/1257* (2013.01); *G06F 17/2247* (2013.01); *G06F 17/248* (2013.01); *G06F 17/2705* (2013.01); *G09B 21/001* (2013.01); *G06F 2206/1512* (2013.01)

(56) References Cited

U.S. PATENT DOCUMENTS

| | | | |
|---|---|---|---|
| 7,500,188 B1 * | 3/2009 | Trapani | G06F 17/211 715/238 |
| 8,619,272 B2 | 12/2013 | Seabright et al. | |
| 8,687,210 B2 | 4/2014 | Sue et al. | |
| 8,964,201 B2 | 2/2015 | Seabright et al. | |
| 9,223,764 B2 | 12/2015 | Seabright et al. | |
| 10,169,320 B2 | 1/2019 | Seabright et al. | |
| 2002/0111974 A1 * | 8/2002 | Dutta | G06F 17/30861 715/273 |
| 2004/0143430 A1 * | 7/2004 | Said | G06F 17/218 704/2 |
| 2005/0125728 A1 | 6/2005 | Piero et al. | |
| 2005/0160065 A1 | 7/2005 | Seeman | |
| 2005/0193334 A1 * | 9/2005 | Ohashi | G06F 17/248 715/246 |
| 2005/0289182 A1 | 12/2005 | Pandian et al. | |
| 2007/0009161 A1 * | 1/2007 | Hollingsworth | G06K 9/00442 382/229 |
| 2008/0155387 A1 | 6/2008 | Yabe | |
| 2008/0235564 A1 | 9/2008 | Erol et al. | |
| 2016/0070677 A1 | 3/2016 | Seabright et al. | |
| 2016/0246773 A1 | 8/2016 | Seabright et al. | |

OTHER PUBLICATIONS

Assistive Technology, http://www.usft.com/article/Assistive-Technology, 2 pages.
Office Action for U.S. Appl. No. 13/045,347, dated Mar. 15, 2013, 10 pages.
Office Action for U.S. Appl. No. 14/136,939, dated Aug. 14, 2014, 5 pages.
Office Action for U.S. Appl. No. 14/595,982, dated Apr. 8, 2015, 11 pages.
Office Action for U.S. Appl. No. 13/107,723, dated Jun. 6, 2013, 8 pages.
Office Action for U.S. Appl. No. 14/939,918, dated Feb. 21, 2018, 11 pgs.
Office Action for U.S. Appl. No. 15/143,003, dated Feb. 21, 2018, 12 pgs.
Notice of Allowance for U.S. Appl. No. 14/939,918, dated Jun. 27, 2018, 8 pgs.
Notice of Allowance for U.S. Appl. No. 15/143,003, dated Dec. 21, 2018, 6 pgs.
Notice of Allowance for U.S. Appl. No. 15/143,003, dated Sep. 4, 2018, 5 pgs.
Notice of Allowance for U.S. Appl. No. 14/939,918, dated Oct. 24, 2018, 5 pgs.

* cited by examiner

ASSISTIVE TECHNOLOGY FOR THE IMPAIRED

CROSS-REFERENCE TO RELATED APPLICATIONS

This application is a continuation in part of U.S. patent application Ser. No. 14/939,918 filed Nov. 12, 2015, which is a continuation of U.S. patent application Ser. No. 14/595,982 filed on Jan. 13, 2015, which is a continuation of U.S. patent application Ser. No. 14/136,939, filed on Dec. 20, 2013, now issued as U.S. Pat. No. 8,964,201, which is a continuation of U.S. patent application Ser. No. 13/045,347, filed on Mar. 10, 2011, issued as U.S. Pat. No. 8,619,272, which claims priority from U.S. Provisional Patent Application No. 61/322,774 filed on Apr. 9, 2010, which are incorporated herein by reference in their entirety.

BACKGROUND OF THE INVENTION

Today, 3.3 million Americans over the age of 40 are blind or have low-vision—a number that will surpass 5 million within the next decade. In addition, over 21 million Americans have profound visual impairments that require large print documents. A vast majority of these individuals have bank accounts, credit cards, and savings in various investment vehicles that require monthly statements. However, these individuals often are unable to access the financial statements that are typically provided.

Many visually impaired individuals use assistive technologies to access digital information. Such assistive technologies range from screen readers to Braille printers. However, many documents and websites are not designed to be compatible with assistive technologies.

The World Wide Web Consortium (W3C) has developed guidelines for technology products. These Web Content Accessibility Guidelines (WCAG) state that websites, software products and electronic documents should be built to work with assistive technologies.

Portable Document Format (PDF) is the most commonly used document format in electronic statements. However, this document format has presented one of the most problematic accessibility issues. A number of organizations have been working to address this issue by outlining the appropriate tagging requirements.

Currently, tagging of PDF documents is manually performed on a per-document basis. Unfortunately, this is a time-consuming and tedious process. There also fails to be a mechanism for tagging of documents that are stored in electronic formats other than PDF.

In view of the above, it would be beneficial if an improved process for tagging documents could be developed.

SUMMARY OF THE INVENTION

The disclosed embodiments support the generation of accessible documents. This may be accomplished through the execution of a template to convert one or more documents into accessible documents. This may be accomplished on a per-document basis, or as a batch process such that a plurality of documents are converted simultaneously.

In accordance with one aspect, an accessible document that is generated may include a plurality of tags, where the plurality of tags conform to a set of accessibility standards for generating documents compatible with an accessibility product for visually impaired individuals. For instance, the plurality of tags may designate an order of a plurality of regions of the accessible document, where the order indicates an appropriate read order for visually impaired individuals. The designated order of the plurality of regions of the accessible document may be different from an order of the plurality of regions of the initial document from which the accessible document was generated.

In accordance with another aspect, documents stored in various formats may be converted to accessible documents. More particularly, when an initial document is obtained, the format of the initial document may be identified as one of a plurality of formats. For example, the format of the initial document may be one of a plurality of print formats. A plurality of parsers may be available for parsing documents of any of the plurality of formats. Therefore, a parser corresponding to the identified one of the plurality of formats may be applied such that the initial document is parsed according to the format of the initial document. More particularly, the initial document may be parsed to identify a plurality of regions of the initial document.

In accordance with yet another aspect, an intermediate document that conforms to an intermediate format may be generated based upon results obtained from applying the parser. More particularly, a data structure or document such as a PDF document identifying each of the plurality of regions of the initial document may be generated. The intermediate document may also include additional information pertaining to the plurality of regions, such as the order of the plurality of regions in the initial document and information (e.g., text) in each of the plurality of fields/regions of the initial document.

In accordance with yet another aspect, the intermediate document may be converted into an accessible document through the use of a template. In the following description, the term "template" will be used to refer to a reusable component that includes computer-readable instructions for converting an intermediate document into an accessible document. In other words, the template may include the computer-readable instructions that are specific to tagging a document of a particular document type (e.g., bill type). The computer-readable instructions for converting an initial document into an intermediate document may not be specific to a particular document type (e.g., bill type). Rather, the computer-readable instructions for converting an initial document into an intermediate document may include instructions for parsing an initial document in a particular format (e.g., print format) to generate an intermediate document in an intermediate format (e.g., PDF). Since the instructions for converting an initial document into an intermediate document are not specific to the document type, these instructions need not be re-saved for each document type and corresponding template. However, in other embodiments, the computer-readable instructions for converting an initial document into an intermediate document may be saved in association with each template.

In accordance with another aspect, a template may be generated through the use of a user interface. More particularly, a user may specify one or more tags to be associated with one or more of a plurality of regions of a first document through the use of a user interface. Through this process, computer-readable instructions for tagging the document may be generated and saved as a template that may executed for tagging other documents (e.g., intermediate documents) of the same document type.

In accordance with certain aspects, automatic detection of the regions of a document may be used in association with the user interface to detect and tag the document or areas thereof. Thus, the individual can select automatic detection of an area of the document or the entire document using the user interface. Alternatively or additionally, once a region is defined or detected (e.g., manually by the user or automatically), the individual can select to automatically detect fields within the region, etc. Thus, the auto detection may be applied to the entire document or a region within the document specified by the individual (e.g., using the user interface).

In accordance with one aspect, a template may be generated during the process of tagging a first document and reused to tag a second document. More particularly, a first document in a first format may be obtained. The first document may be parsed to generate an intermediate document that conforms to an intermediate format. A template including computer-readable instructions for converting the intermediate document into an accessible document may be generated. The template may then be executed to convert the first document, as well as a second, different document, into an accessible document. The second document need not be in the same format as the first document. For instance, the first document and the second document may be saved as two different print formats. While the first document and the second document need not be in the same format, they should be of the same type. For instance, the first document and the second document may both be a utility bill.

In accordance with yet another aspect, once a template has been saved, the pre-existing template may be "re-used" to tag other documents of the same document type. In one embodiment, an initial document may be obtained and parsed to generate an intermediate document that conforms to an intermediate format. For example, the initial document may be parsed to identify a plurality of regions of the initial document. The intermediate document may therefore identify the plurality of regions of the initial document, as well as other information pertaining to the plurality of regions of the initial document. An existing template including computer-readable instructions for converting an intermediate document of the document type into an accessible document may be obtained and executed such that an accessible document corresponding to the initial document is generated from the intermediate document.

In accordance with yet another aspect, a plurality of documents of the same document type may be converted to accessible documents using the template that corresponds to that document type. For instance, the plurality of documents may include bank statements to be issued from a particular bank, where each of the bank statements is a statement for a different individual. More particularly, a set of initial documents may be obtained, where each of the set of initial documents is a first document type (e.g., bank statement). Each of the set of initial documents may be parsed to identify a plurality of regions of the corresponding one of the set of initial documents. A template including computer-readable instructions for generating an accessible document including the plurality of regions for the first document type may be obtained and executed such that an accessible document is generated for each of the set of initial documents.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Web Content Accessibility Guidelines (WCAG) are part of a series of Web accessibility guidelines published by the W3C's Web Accessibility Initiative. They consist of a set of guidelines on making content accessible, primarily for disabled users, but also for devices such as highly limited devices, such as mobile phones.

The disclosed embodiments enable an accessible document to be generated from an initial document in accordance with web accessibility guidelines such as WCAG 1.0, published on May 5, 1999, or WCAG 2.0, published on Dec. 11, 2008, which are incorporated herein by reference for all purposes. When printed or viewed via a display, the accessible document may appear to be identical to the initial document. However, the accessible document may be compatible with various accessibility products enabling visually impaired individuals to "read" the accessible document, as will be described in further detail below. Various accessibility products include speech synthesizers (i.e., readers) capable of reading a document, technology that renders hard-copy output into Braille, and Braille devices. In addition, the accessible document may make the content of the initial document accessible to various devices such as mobile phones.

In the following description, the term document may be used to describe an electronic document (e.g., file) or data structure representing a physical document that may be printed or displayed via a suitable medium (e.g., printer or display). The document may include text and/or images (e.g., graphics, photographs, logos, etc.). In addition, the document may include formatting information such as font characteristics (e.g., font size, bold, italics, underline, color, etc.).

The disclosed embodiments may be implemented in software and/or hardware. For example, the software may be implemented in an object-oriented language such as C++ or Java.

Figure 1:
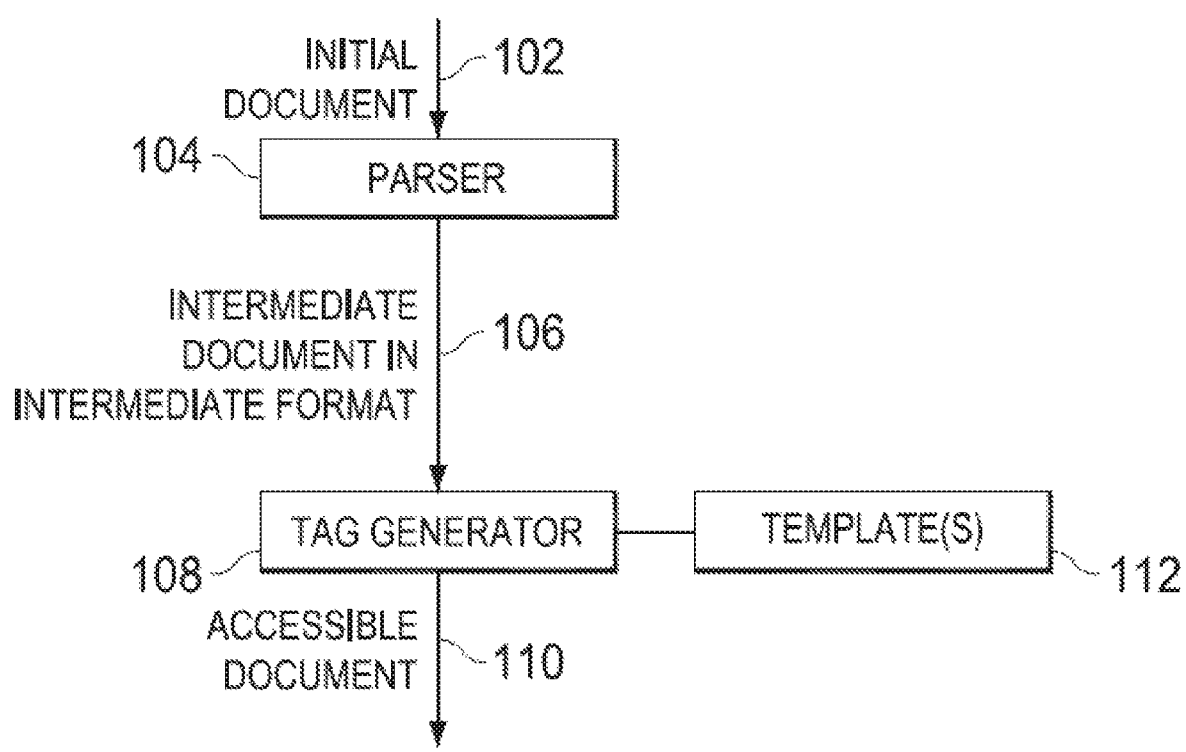
FIG. 1 is a block diagram illustrating an example system in which various embodiments may be implemented.

FIG. 1 is a block diagram illustrating an example system in which various embodiments may be implemented. As shown at 102, an initial document may be received. For example, the initial document may be a bill, book, magazine, newspaper, or article. In addition, the format of the initial document may be one of a variety of formats capable of being parsed and converted to an accessible document via a system such as that described herein. For example, the initial document may include a print stream in one of various print formats such as Advanced Function Printing (AFP), line data, metacode, Printer Command Language (PCL), Portable Document Format (PDF), or TIFF.

Upon receiving the initial document 102, a parser 104 may parse the initial document in order to generate an intermediate document in an intermediate format 106. For example, the intermediate format may be PDF. Moreover, information provided in the intermediate document may be stored in a data structure such as an object (i.e., instantiation of a class) generated in an object-oriented language.

In one embodiment, the parser 104 parses the initial document 102 in order to identify or define a plurality of regions (i.e., sections) within the initial document 102. In this manner, the logical structure of the document may be identified. For example, the regions that are identified may include specific fields, rows, or columns within the initial document 102. Examples of regions that may be identified for a bill include a title, due date of a bill, an amount due, a name of the individual to which the bill is addressed, an address of the individual to which the bill is addressed, and/or one or more line items/rows including text describing an item billed and a corresponding amount billed for the item. Each of the regions may be defined by a rectangular area or a border surrounding the region. Thus, content from each of the identified regions may be extracted. This content may then be used to generate the intermediate document in the intermediate format 106. More particularly, the content may be stored in an intermediate data structure such as an object, which may then be used to generate the intermediate document.

A tag generator 108 may generate an accessible document 110 from the initial document 102 by "tagging" the corresponding intermediate document through the execution of a template. More particularly, the tag generator 108 may tag the intermediate document by inserting one or more tags at various points within the intermediate document. The tags in an accessible document may designate an order of the various fields or regions within the accessible document. This order will be interpreted by an accessibility product as a "reading order," where the order is appropriate for the visually impaired. In this manner, the disclosed embodiments may enable a visually impaired person to better understand the information presented in a variety of documents.

In order to generate a template, an individual may specify tags associated with various identified regions of an initial document or intermediate document via a graphical user interface. More particularly, when the individual chooses to tag an initial document, the initial document may be automatically parsed to generate a corresponding intermediate document. A user interface may be provided to enable the individual to select region(s) within the initial/intermediate document and submit tags to be inserted in association with the selected region(s), resulting in the generation of an accessible document.

Thus, in order to generate a template in accordance with certain embodiments, an individual can view a document in the graphical individual interface. This view may, for example, be a visual presentation of the print format version of the document. Using the visual presentation of the document an individual can manually configure the structure of the pages within a document by defining the regions of a document, hierarchy of the regions, submitting tags to be inserted with respect to the regions, etc. For example, using the interface the individual may draw a box around an area of the visual presentation of the document and define the area of the visual presentation encompassed by the box as a region; may draw a box around an area of the visual presentation of the document and define the area of the visual presentation encompassed by the box as a field within region; may draw a box around an area of the visual presentation of the document and define the area of the visual presentation encompassed by the box as a table, then manually define the columns of the table, etc. This manual selection of regions of a document and submission of tags can be time consuming and tedious.

Accordingly, in accordance with certain aspects, automatic detection of the regions of a document may be used in association with the visual presentation of the document to detect and tag the document or areas thereof, for use in, for example, generating a template based on that document. Thus, when the visual presentation of the document is presented to an individual, the individual can select automatic detection of an area of the document or the entire document. Alternatively or additionally, once a region is defined or detected (e.g., manually by the user or automatically), the individual can select to automatically detect fields within the region, etc. Thus, the auto detection may be applied to the entire document or a region within the document specified by the individual (e.g., using the graphical interface). In certain embodiments, the individual may provide "hints" about the area being detected such as the number of regions, fields or columns to that may exist (e.g., the default may be unknown) or the breakup of the area (e.g., a column-based breakup, a row-based breakup, or mix columns and rows, with the default again being unknown).

A set of computer-readable instructions for tagging a document of the same type may be automatically generated as a result of this process. For example, the computer-readable instructions may be generated in a markup language such as Extensible Markup Language (XML). Once all of the tags for the document have been specified, the set of computer-readable instructions may be saved as a template 112. The template 112 may be named and/or associated with a particular type of document. Thus, a first template may be saved in association with a first type of document, while a second template may be saved in association with a second type of document. Various types of documents may include documents generated by a specific company, newspapers, magazines, articles, books, or bills. More particularly, an electric bill generated by an electric company will generally have a different format from a credit card bill generated by a credit card company. In fact, each credit card company may use a different format when generating their credit card statements. Therefore, a different template may be generated in order to convert each of these different types of documents to an accessible document 110. A method of generating a template for converting an initial document to an accessible document will be described in further detail below with reference to FIG. 2.

A template 112 is a reusable component that may include computer-readable instructions for tagging an intermediate document. In some embodiments, the template 112 may also include instructions for parsing an initial document and generating an intermediate document corresponding to the initial document, as described herein.

Assuming that a template has previously been generated and saved as shown at 112, the template 112 may be executed in order to tag another document of the same type. More particularly, the template may correspond to a particular type of the initial document. The type of document may be any form of printable document that contains encoded text and/or images and has a consistent repeating logical structure or layout across many instances of that document type.

When the template is executed in association with the current initial document, the executing template may automatically tag the corresponding intermediate document. Through the execution of the template to tag the intermediate document, the initial document 102 may be "converted" to an accessible document 110. The accessible document 110 may then be output or saved for later retrieval. In one embodiment, the accessible document 110 is a PDF document. A method of converting an initial document to an accessible document using an existing template will be described in further detail below with reference to FIG. 3.

Figure 2A:
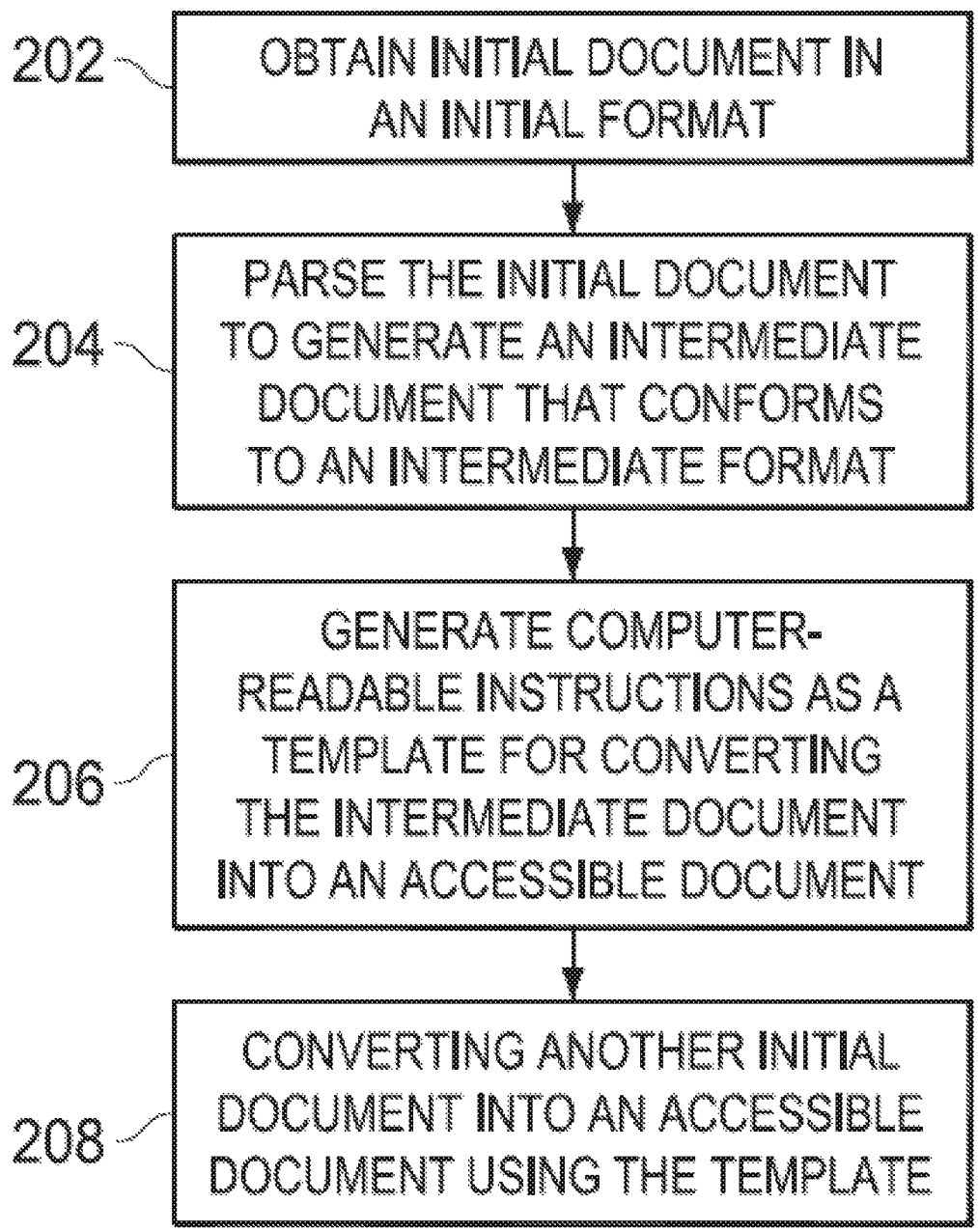
FIG. 2A is a process flow diagram illustrating a method of generating a template for converting an initial document to an accessible document.

FIG. 2A is a process flow diagram illustrating a method of generating a template in accordance with various embodiments of the invention. An initial document in an initial format may be obtained at 202. In one embodiment, the initial document conforms to a print format.

It would be desirable to support the generation of accessible documents from multiple formats. This may be accomplished by parsing an initial document to generate an intermediate document that conforms to an intermediate format at 204. More particularly, a format of the initial document may be identified as one of a plurality of formats for which accessible documents can be generated. One of a plurality of parsers corresponding to the one of the plurality of formats may then parse the initial document according to the format of the initial document. For example, where the initial document conforms to one of a plurality of print formats, a format of the initial document may be identified as one of the plurality of print formats. Parsing of the initial document may then be performed according to the identified print format.

During the parsing process, a plurality of regions of the initial document may be defined or identified. For example, a row of a statement or bill may be identified as a line item of the bill. This may be accomplished despite the variations in size or height of the rows. These regions may be defined by the names of one or more field(s) within the regions and/or physical dimensions of regions within the initial document. The region names and/or content within the regions may be stored in an intermediate data structure. Based upon the identified regions, an intermediate document including the plurality of regions may be generated.

Computer-readable instructions for converting the intermediate document representing the plurality of regions into an accessible document may be generated at 206 via a user interface, as set forth above. A template including the computer-readable instructions may be stored as a template for converting the intermediate document into an accessible document.

The template may then be executed at 208 such that an accessible document corresponding to another, second initial document of the same type is generated. More particularly, the second initial document may be parsed to identify regions within the second initial document, enabling an intermediate document including the identified regions to be generated, as set forth above. The intermediate document corresponding to the second initial document may be automatically tagged as specified in the template in order to generate the accessible document. For example, the accessible document may be a PDF document that conforms to the PDF format.

The accessible document may include a plurality of tags that conform to a set of accessibility standards for generating documents compatible with an accessibility product for visually impaired individuals. The plurality of tags may designate or otherwise indicate an order of a plurality of regions of the accessible document, enabling an accessibility product or other device to relay the information in the tagged regions of the accessible document in the designated order. The designed order of the plurality of regions of the accessible document may be different from an order of the plurality of regions in the initial document. For example, while the amount due region of an initial bill may be present at the end of the bill, the amount due region may be tagged as the first piece of information in an accessible document generated from the initial bill. In this manner, information in a document may be reordered in a manner that is more suited to visually impaired individuals.

Tagging may be performed in accordance with accessibility standards, and therefore may be used in a variety of scenarios. Moreover, readers typically do not understand how to read and interpret non-textual information such as tables, charts, logos, hypertext links, and images. Thus, in order to relay this non-textual information to a visually impaired individual, an accessible document may be tagged with alternate text to replace this non-textual information. An accessibility product may interpret this additional text as alternate text to be "read" or otherwise communicated in place of the information in the corresponding tagged region of the document. As one example, a tag may be used to identify (or replace) an image present in one of the plurality of regions of the initial or intermediate document. Through the use of tagging, a pre-defined set of text associated with the image may be added to the intermediate document during generation of an accessible document. As another example, a tag indicating a company's name may be added in association with a logo. As yet another example, text such as "Dec. 1, 2010" may be added in association with a date in a format such as "12/01/10." Furthermore, tagging may notify readers that information in a table is presented in rows and columns so that it can be properly delivered and understood by a visually impaired individual. For instance, tagging may identify rows and columns of a table. Text may also be added in association with hypertext links or graphics.

Tagging may also be used to specify a particular language in which the accessible document is to be presented to a user via an accessibility product. For example, the language may be tied to a particular user such as the user of the accessibility product. An accessibility product would therefore be able to communicate information in the accessible document in the specified language.

Figure 2B:
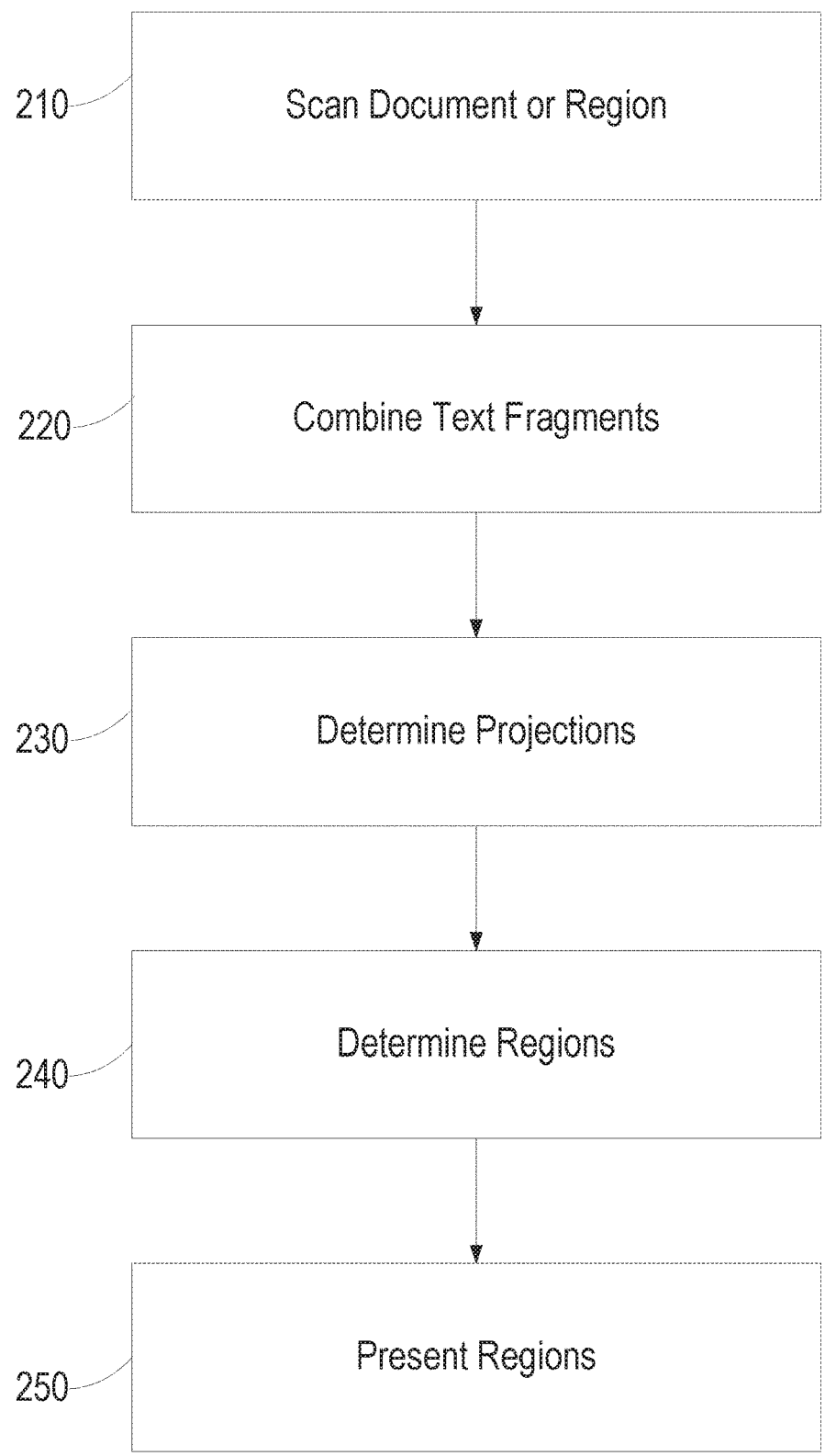
FIG. 2B is a process flow diagram illustrating a method of defined or identifying regions of a document or tags associated with regions in accordance with various embodiments of the invention.

FIG. 2B is a process flow diagram illustrating a method of defined or identifying regions of a document or tags associated with regions, in accordance with various embodiments of the invention. As discussed, in certain embodiments automatic detection of the regions of a document may be used in association with the visual presentation of the document to detect and tag the document or areas thereof, for use in, for example, generating a template based on that document. Thus, when the visual presentation of the document is presented to an individual the individual can select automatic detection of an area of the document or the entire document. Alternatively or additionally, once a region is defined or detected (e.g., manually by the user or automatically), the individual can select to automatically detect fields within the region, etc. Thus, the auto detection may be applied to the entire document or a region within the document specified by the individual (e.g., using the graphical interface). In certain embodiments, the individual may provide "hints" about the area being detected such as the number of regions, fields or columns to that may exist (e.g., the default may be unknown) or the breakup of the area (e.g., a column-based breakup, a row-based breakup, or mix columns and rows, with the default again being unknown).

The document or region may initially be scanned at step 210. This scanning may scan the intermediate format of the document. This intermediate format may, for example, by the Xenos Intermediate format (XIF) and the auto detection feature may scan the XIF Elements of the intermediate format of the document to determine which elements are contained fully within or mostly within the boundaries of the document or region being scanned. In particular, the horizontal lines, vertical lines, vectors, images and Text (fragments) in all four print directions are collected, segregated and sorted by location during the scan.

According to one aspect this intermediate format may describe all "marks" on the page. These marks may include, for example, all images such as a 1×1 inch logo, all lines which may make up the boundaries of a table or underscore a header, all vectors which may represent a graphic (e.g., a histogram, pie chart, etc.), shaded areas to highlight an area, and all text fragments on the page.

According to aspects, a text fragment is one or more characters in a known encoding (e.g., Unicode), that is drawn or represented by a font. If text presented visually on a page is part of an image, it may not be treated as a text fragment. In other words, optical character recognition may not be performed on this text. The fragments are typically whole words without spaces (e.g., "this has seven fragments, as an example"). However, the text fragments may be partial words or even a single character. The text fragments may have an implied reading order, top/down, left/right, although they can be represented in the print stream in any order. Vectors are interpreted to determine the exact boundaries of the vector graphic associated with the vector, and may be converted into horizontal/vertical lines.

The text fragments can be combined at step 220. In one aspect, the text fragments in the most used print direction are scanned and fragments that are within a threshold the width (e.g. 50%) of a space are combined together. Then, text fragments that are close enough to be considered part of the same sentence are also combined. These combined text fragments are then treated as text lines. In one aspect, text fragments in the other three print directions (e.g., other than the most used print direction) are treated as images for the purpose of auto detection. This treatment may occur because text fragments aligned along the other three direction may be used as separating text. For example, a long sentence running from the "bottom" of a document to the "top" of a document may actually separate two sides of a section.

The Xprojection and Yprojections for the text lines can be determined at step 230. These Xprojections and Yprojections are the distance (e.g., number of pixels) between each text line and each other text line. These Xprojections and Yprojections can be determined by comparing one text line to the other text line to detect the gap (distance) between the text lines in both the horizontal (Xprojection) and vertical (Yprojection) directions.

The regions in the area (e.g., specified by the individual or the entire document) on which auto detection is being performed may be determined based on the Xprojections and Yprojections at step 240. As discussed, the individual may have provided hints about the area being detected, thus these hints may be evaluated along with the Xprojections and Yprojections for the text lines to, for example, compare these projections to threshold distances to determine the regions of the area. The examination may be an iterative process that evaluates the projections and any hints given by the user to determine a most likely result for the regions in the area.

The determined regions are returned to the user interface and presented to the user in conjunction with the graphical presentation of the document at step 250. For example, the regions may be added to the page and presented graphically through a box around the determined region, fields may be added to the region, columns presented in conjunction with a table, etc. The individual can then accept these auto-detected regions or may edit or alter these regions as discussed above.

Figure 3:
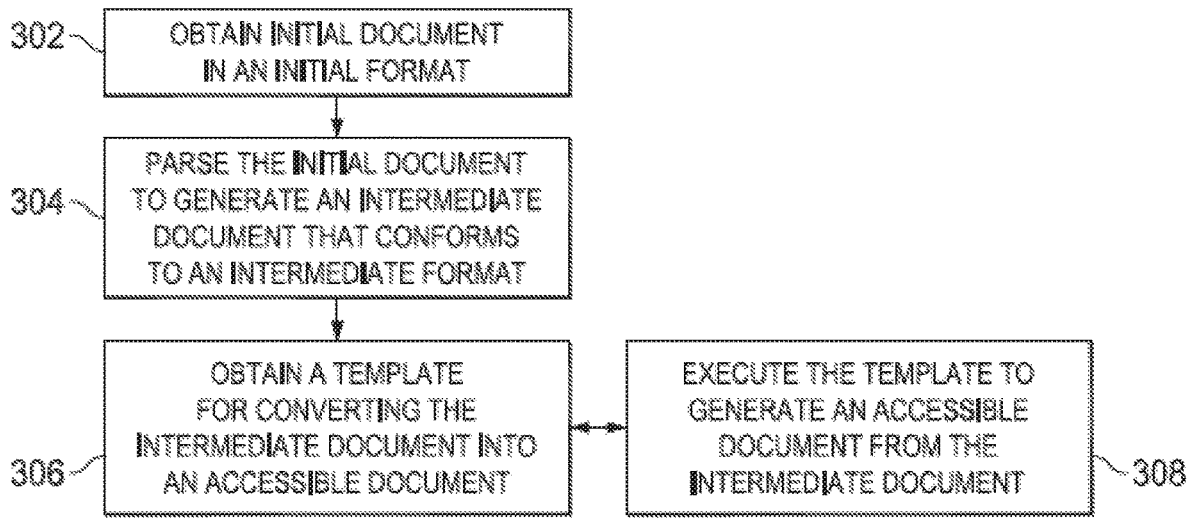
FIG. 3 is a process flow diagram illustrating an example method of executing a template in accordance with various embodiments of the invention.

FIG. 3 is a process flow diagram illustrating a method of executing a template in accordance with various embodiments of the invention. An initial document may be obtained at 302. The initial document may be parsed at 304 to generate an intermediate document that conforms to an intermediate format, as set forth above. More particularly, the initial document may be parsed to identify a plurality of regions of the initial document in order to generate the intermediate document. A template for generating an accessible document from the intermediate document may be obtained at 306. The template may then be executed at 308 such that an accessible document is generated from the intermediate document, wherein the accessible document includes a plurality of tags that designate an order of a plurality of regions of the accessible document.

Conversion of a document to an accessible document may be performed on an as-needed basis on demand in response to a request from an individual. For instance, the individual may submit a request for an accessible document corresponding to a particular initial document (or request generation of the accessible document). The request may be received off-line or on-line. For instance, the individual may submit a request via a user interface coupled to a website suitable for generating and/or providing access to accessible documents. In one embodiment, the individual may log in to his or her account via the website in order to generate, view or otherwise obtain an accessible document from his or her account. Thus, the request may indicate an identity of the individual associated with the initial document. Upon receiving the request, the accessible document may be generated and provided to the individual in real-time (e.g., by providing an electronic version such as a PDF of the accessible document for viewing or downloading) or at a later time (e.g., via postal mail). The generation and/or providing of the accessible document may be performed automatically, or upon initiation by a user (e.g., the individual).

Alternatively, conversion of documents to accessible documents may be performed as a batch process to generate a plurality of accessible documents. The accessible documents may be stored for later retrieval. More particularly, each of the accessible documents may be provided in response to a request from an individual, as set forth above.

Figure 4:
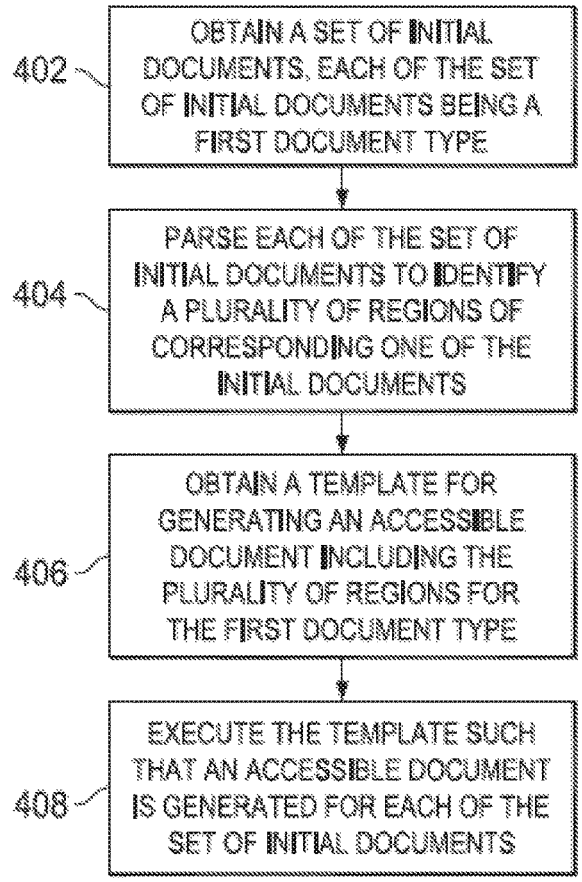
FIG. 4 is a process flow diagram illustrating a method of processing a batch of documents in accordance with various embodiments.

FIG. 4 is a process flow diagram illustrating a method of processing a batch of documents in accordance with various embodiments. A set of initial documents may be obtained at 402, each of the set of initial documents being a first document type. For example, a composition engine may generate a single file including a plurality of documents. The file may then be processed accordingly. More particularly, each of the set of initial documents may be parsed to identify a plurality of regions of the corresponding one of the set of initial documents at 404. A template for generating an accessible document including the plurality of regions for the first document type may be obtained at 406. The template may be executed such that an accessible document is generated for each of the set of initial documents, wherein each accessible document includes a plurality of tags that designate an order of the plurality of regions of the accessible document.

The accessible document that is generated for each of the set of initial documents may be stored such that a plurality of accessible documents are stored. One of the pluralities of accessible documents may then be provided in response to a request indicating an identity of an individual associated with the one of the plurality of accessible documents.

The disclosed embodiments may be used advantageously by companies to convert high volume documents such as bills in an efficient manner. Moreover, data formatted for a printer may be captured and transformed into an accessible document. Therefore, organizations may capture data from high-volume print streams and transform it into accessible documents. Through the automation of the generation of accessible documents, organizations can gain a competitive advantage by supporting an underserved consumer segment. Moreover, the ability to generate accessible documents eliminates the need for these organizations to contract with outsourcers to generate accessible documents on a per-document basis.

Figure 5:
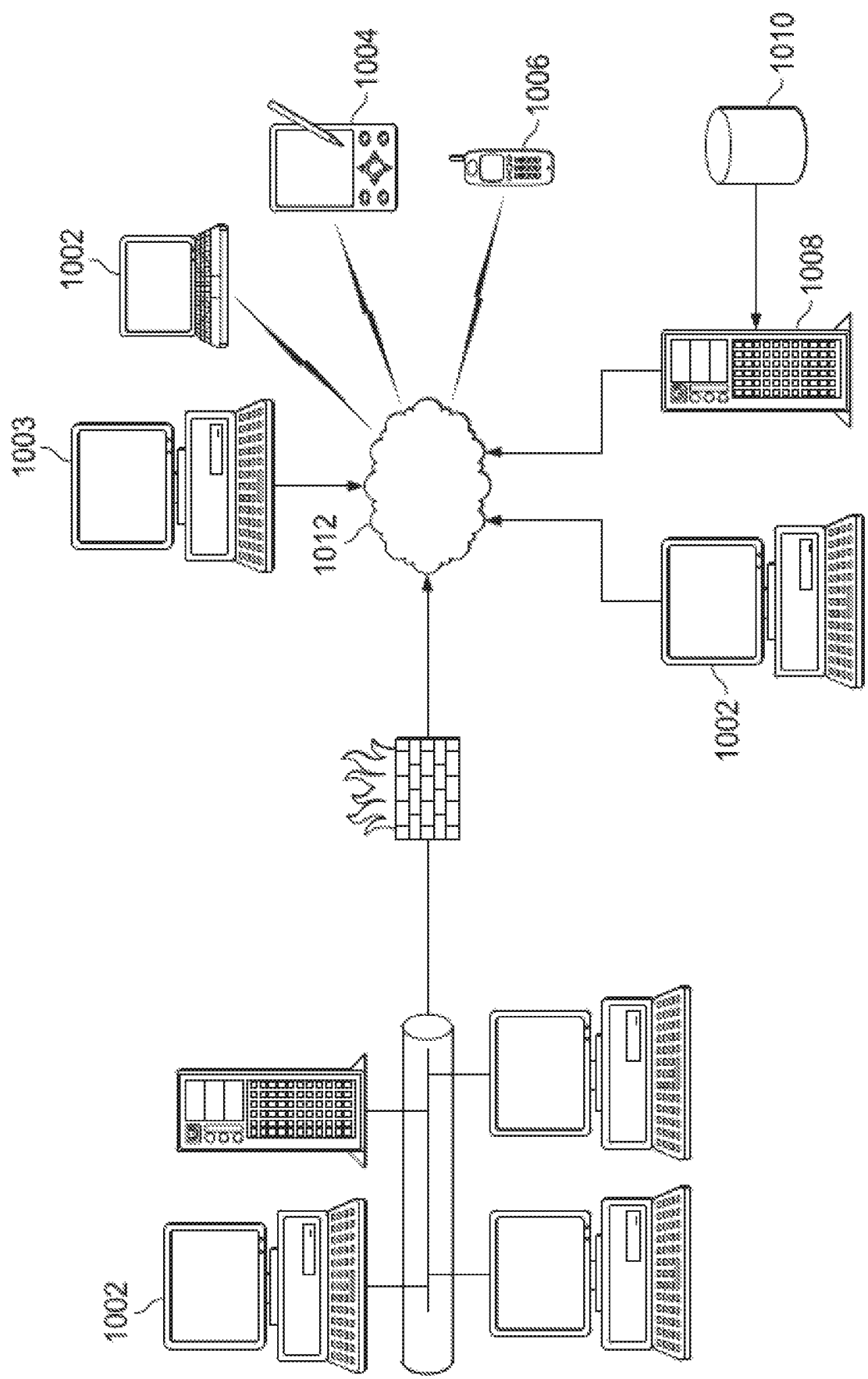
FIG. 5 is a diagram illustrating an example system in which various embodiments may be implemented.

Embodiments of the present invention may be employed to generate accessible documents in any of a wide variety of computing contexts. For example, as illustrated in FIG. 5, implementations are contemplated in which the relevant population of users interact with a diverse network environment via any type of computer (e.g., desktop, laptop, tablet, etc.) 1002, media computing platforms 1003 (e.g., cable and satellite set top boxes and digital video recorders), handheld computing devices (e.g., PDAs) 1004, cell phones 1006, or any other type of computing or communication platform.

An accessible document may be generated or accessed according to the invention in some centralized manner. This is represented in FIG. 5 by server 1008 and data store 1010 which, as will be understood, may correspond to multiple distributed devices and data stores. The invention may also be practiced in a wide variety of network environments (represented by network 1012) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. The apparatus of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store documents being converted to accessible documents, accessible documents, computer-readable instructions for enabling a user to tag documents via a graphical user interface, templates that have been generated as a result of tagging an initial document, computer-readable instructions for generating a graphical user interface enabling a user to tag an initial document or execute a previously generated template for tagging documents, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 6:
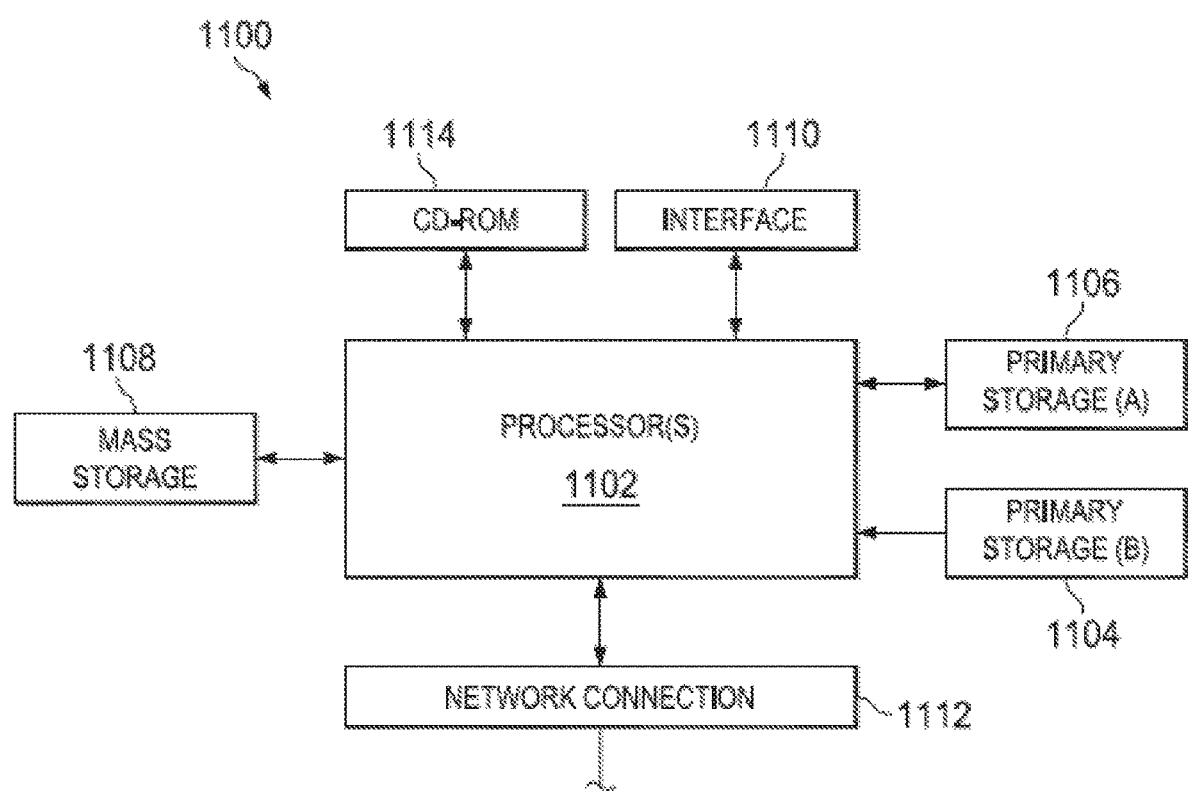
FIG. 6 illustrates an example computer system via which various embodiments may be implemented.

FIG. 6 illustrates a typical computer system that, when appropriately configured or designed, can serve as a system of this invention. The computer system 1100 includes any number of processors 1102 (also referred to as central processing units, or CPUs) that are coupled to storage devices including primary storage 1106 (typically a random access memory, or RAM), primary storage 1104 (typically a read only memory, or ROM). CPU 1102 may be of various types including microcontrollers and microprocessors such as programmable devices (e.g., CPLDs and FPGAs) and unprogrammable devices such as gate array ASICs or general purpose microprocessors. As is well known in the art, primary storage 1104 acts to transfer data and instructions uni-directionally to the CPU and primary storage 1106 is used typically to transfer data and instructions in a bi-directional manner. Both of these primary storage devices may include any suitable computer-readable media such as those described above. A mass storage device 1108 is also coupled bi-directionally to CPU 1102 and provides additional data storage capacity and may include any of the computer-readable media described above. Mass storage device 1108 may be used to store programs, data and the like and is typically a secondary storage medium such as a hard disk. It will be appreciated that the information retained within the mass storage device 1108, may, in appropriate cases, be incorporated in standard fashion as part of primary storage 1106 as virtual memory. A specific mass storage device such as a CD-ROM 1114 may also pass data unidirectionally to the CPU.

CPU 1102 may also be coupled to one or more interfaces 1110 that connect to one or more input/output devices such as such as video monitors, track balls, mice, keyboards, microphones, touch-sensitive displays, transducer card readers, magnetic or paper tape readers, tablets, styluses, voice or handwriting recognizers, speakers, accessibility devices such as speech synthesizers (i.e., readers) or Braille devices, or other well-known input devices such as, of course, other computers. Finally, CPU 1102 optionally may be coupled to an external device such as a database or a computer or telecommunications network using an external connection as shown generally at 1112. With such a connection, it is contemplated that the CPU might receive information such as an accessible document from the network, or might output information such as a request for an accessible document to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

The invention claimed is:

1. A method, comprising:
   receiving a first electronic document including a plurality of regions;
   identifying, by a processor, the plurality of regions in the first electronic document; and
   processing the first electronic document using a template to generate a second electronic document by tagging at least a subset of the plurality of regions of the first electronic document with information indicating a logical order of the plurality of the regions based on the template, the tagging information conforming to at least one accessibility standard and allowing an accessibility product to present the subset of the plurality of regions through a computing device according to the logical order without user specification of the logical order of presentation.

2. The method of claim 1, wherein the template includes a set of tagging rules corresponding to a type of the first document.

3. The method of claim 2, wherein the template defines the plurality of regions in association with the set of tagging rules.

4. The method of claim 3, further comprising automatically detecting the plurality of regions.

5. The method of claim 4, wherein the automatically detected plurality of regions are saved in the template.

6. The method of claim 5, wherein the plurality of regions are automatically detected by determining a plurality of text fragments associated with at least one of the plurality of regions and determining a gap between the plurality of text fragments.

7. The method of claim 6, wherein the plurality of text fragments have a reading order.

8. A non-transitory computer-readable storage medium storing instructions thereon, the instructions when executed by a processor cause the processor to:
   receive a first electronic document including a plurality of regions;
   identify, by a processor, the plurality of regions in the first electronic document; and
   process the first electronic document using a template to generate a second electronic document by tagging at least a subset of the plurality of regions of the first electronic document with information indicating a logical order of the plurality of the regions based on the template, the tagging information conforming to at least one accessibility standard and allowing an accessibility to product to present the subset of the plurality of regions through a computing device according to the logical order without user specification of the logical order of presentation.

9. The computer-readable storage medium of claim 8, wherein the template includes a set of tagging rules corresponding to a type of the first document.

10. The computer-readable storage medium of claim 9, wherein the template defines the plurality of regions in association with the set of tagging rules.

11. The computer-readable storage medium of claim 10, wherein the instructions cause the processor to automatically detect the plurality of regions.

12. The computer-readable storage medium of claim 11, wherein the automatically detected plurality of regions are saved in the template.

13. The computer-readable storage medium of claim 12, wherein the plurality of regions are automatically detected by determining a plurality of text fragments associated with at least one of the plurality of regions and determining a gap between the plurality of text fragments.

14. The computer-readable storage medium of claim 13, wherein the plurality of text fragments have a reading order.

15. A system for converting documents, comprising:
   a processor; and
   a computer readable medium, comprising instructions executable on the processor for:
   receiving a first electronic document including a plurality of regions;
   identifying, by a processor, the plurality of regions in the first electronic document; and
   processing the first electronic document using a template to generate a second electronic document by tagging at least a subset of the plurality of regions of the first electronic document with information indicating a logical order of the plurality of the regions based on the template, the tagging information conforming to at least one accessibility standard and allowing an accessibility to product to present the subset of the plurality of regions through a computing device according to the logical order without user specification of the logical order of presentation.

16. The system of claim 15, wherein the template includes a set of tagging rules corresponding to a type of the first document.

17. The system of claim 16, wherein the template defines the plurality of regions in association with the set of tagging rules.

18. The system of claim 17, wherein the instructions are executable on the processor for automatically detecting the plurality of regions.

19. The system of claim 18, wherein the automatically detected plurality of regions are saved in the template.

20. The system of claim 19, wherein the plurality of regions are automatically detected by determining a plurality of text fragments associated with at least one of the plurality of regions and determining a gap between the plurality of text fragments.

21. The system of claim 20, wherein the plurality of text fragments have a reading order.

\* \* \* \* \*